(12) United States Patent
Nakagawa et al.

(10) Patent No.: US 8,967,649 B2
(45) Date of Patent: Mar. 3, 2015

(54) MOTORCYCLE REAR BODY STRUCTURE

(71) Applicant: Kawasaki Jukogyo Kabushiki Kaisha, Hyogo (JP)

(72) Inventors: Kenichi Nakagawa, Kobe (JP); Norikazu Matsumura, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 14/098,355

(22) Filed: Dec. 5, 2013

(65) Prior Publication Data
US 2014/0167452 A1  Jun. 19, 2014

(30) Foreign Application Priority Data
Dec. 19, 2012  (JP) .................. 2012-276541

(51) Int. Cl.
B62D 25/18 (2006.01)
B62J 15/00 (2006.01)

(52) U.S. Cl.
CPC ........................... B62J 15/00 (2013.01)
USPC ..................................................... 280/152.1

(58) Field of Classification Search
USPC ................... 280/152.1, 152.2, 848, 849, 219; 293/105; 296/198
See application file for complete search history.

(56) References Cited

U.S. PATENT DOCUMENTS

| 5,715,778 | A  | * | 2/1998 | Hasumi et al. | 123/41.51 |
| 7,188,696 | B2 | * | 3/2007 | Arnold | 180/229 |
| 7,537,077 | B2 | * | 5/2009 | Nakashima et al. | 180/229 |
| 7,686,116 | B2 | * | 3/2010 | Oohashi et al. | 180/219 |
| 7,766,355 | B2 | * | 8/2010 | Ichihara | 280/152.3 |
| 2007/0107967 | A1 | * | 5/2007 | Satake | 180/218 |

FOREIGN PATENT DOCUMENTS

JP    2010-083325    4/2010

* cited by examiner

Primary Examiner — John Walters
Assistant Examiner — James Triggs

(57) ABSTRACT

A rear fender overhanging a rear wheel of a motorcycle is disposed rearwardly of a rider's seat, and a side cover is disposed diagonally forwardly downwardly of the rear fender and beneath the rider's seat. The side cover conceals a rear frame structure from outside. The rear fender has a fender overlap portion formed in a lower portion of an outer side portion thereof, and the side cover has a cover overlap portion formed in a rear portion thereof, which cover overlap portion is overlapped on the fender overlap portion. The fender overlap portion has an undersurface provided with a projection, and the cover overlap portion is provided with an engagement hole engageable with the projection.

7 Claims, 5 Drawing Sheets

MOTORCYCLE REAR BODY STRUCTURE

CROSS REFERENCE TO THE RELATED APPLICATION

This application is based on and claims Convention priority to Japanese patent application No. 2012-276541, filed Dec. 19, 2012, the entire disclosure of which is herein incorporated by reference as a part of this application.

BACKGROUND OF THE INVENTION

1. Field of the Invention

The present invention relates to a motorcycle body structure and, more particularly to a rear frame assembly in a motorcycle including a rear fender, overhanging a motorcycle rear wheel, and a rear side cover positioned below a motorcycle seat assembly and on each side of the motorcycle for covering a rear frame assembly of a motorcycle frame structure.

2. Description of Related Art

In most of the motorcycles, it is well known that a rear fender, disposed on a rear frame assembly of the motorcycle so as to overhang the rear wheel, and a rear side cover, employed on each side of the motorcycle so as to cover that rear frame assembly of the motorcycle, are mounted on a motorcycle frame structure. The rear fender and the rear side cover are mounted on a rear frame portion of the motorcycle frame structure separately and independently of each other and are not connected with each other. In such case, the side covers have their respective rear portions left open in a direction laterally of the motorcycle, resulting in formation of gaps each between the rear fender and the respective side cover. Also, the JP Laid-open Patent Publication No. 2010-083325, for example, suggests the use of a large sized rear fender overhanging the rear wheel in its entirety and side covers both secured to the rear fender by means of bolts.

It has, however, been found that although in the motorcycle disclosed in the above described patent document no gap is formed between the rear fender and each of the side covers, the rear fender is so large that the aesthetic appearance of the motorcycle tends to be impaired enough to give out a lumpish sensation and, also, the cost of manufacture of the rear fender tends to increase.

SUMMARY OF THE INVENTION

In view of the foregoing, the present invention herein disclosed is intended to provide a motorcycle of a kind in which the formation of the gaps between the rear fender and each of the side covers can be suppressed without allowing the rear fender to be increased in size.

In order to accomplish the foregoing object of the present invention, there is provided a motorcycle which includes a rear fender overhanging a rear wheel and a side cover concealing a motorcycle frame structure from outside at a location below a rider's seat, in which the rear fender is disposed rearwardly of the rider's seat, and the side cover is disposed below the rider's seat and forwardly of the rear fender. In this motorcycle, the rear fender referred to above has an outer side portion and a fender overlap portion referred to above is formed in a lower portion of the outer side portion of the rear fender. Also, the side cover has a rear portion and a cover overlap portion being formed in a rear portion of the side cover for engagement with the fender overlap portion. One of the fender and cover overlap portions has an engagement portion and the other of the fender and cover overlap portions has a to-be-engaged portion, wherefore the engagement portion is engaged with the to-be-engaged portion to thereby regulate the position of the side cover in leftward and rightward directions.

According to the above described construction, since the front portion of the rear fender and a rear portion of the side cover are engaged with each other, opening of the rear portion of the side cover in leftward and rightward direction is suppressed and no gap is formed between the rear fender and the side cover. Also, since the rear portion of the side cover is merely engaged with the front portion of the rear fender, there is no need that the rear fender should be extended forwards and should be overlapped on and bolted to the side cover, and, therefore, an increase in size of the rear fender can be suppressed.

In a preferred embodiment of the present invention, the fender and cover overlap portions preferably cooperate with each other to form a gripping portion extending in a direction widthwise of the motorcycle, and, in this case the gripping portion is gripped when a motorcycle rear portion or substructure is to be uplifted. According to this structural feature, since the gripping portion is formed by both of the fender and cover overlap portions, the rigidity becomes high. Therefore, a manner of uplifting the motorcycle rear portion with a hand gripping the gripping portion can be facilitated.

Where the fender overlap portion and the cover overlap portion extend in a direction widthwise of the motorcycle, the fender overlap portion preferably has an undersurface formed with a projection that serves as the engagement portion, in which case the cover overlap portion is provided with an engagement hole in which the projection is inserted. According to this structural feature, with a simplified structure, the engagement portion and the to-be-engaged portion can be constructed. Also, the engagement portion, which is in the form of the projection, participates in increasing the rigidity of the fender overlap portion.

In another preferred embodiment of the present invention, the fender and cover overlap portions preferably extend diagonally upwardly towards the outside in a direction widthwise of the motorcycle. According to this structural feature, when the rear portion of the motorcycle is to be uplifted with one hand holding a handlebar on one side of the motorcycle and with the other hand gripping the gripping portion on the other side, a force of the hand acting in a diagonally upwardly and inwardly relative to the gripping portion is applied to the gripping portion in a right angle and, therefore, the uplifting of the motorcycle rear portion can be easily accomplished.

In a further preferred embodiment of the present invention, the side cover is preferred connected with the motorcycle frame structure by means of a fastening member at a location forwardly thereof remote from the cover overlap portion. According to this structural feature, the side cover can be stably supported with a fastening portion and an engagement portion.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
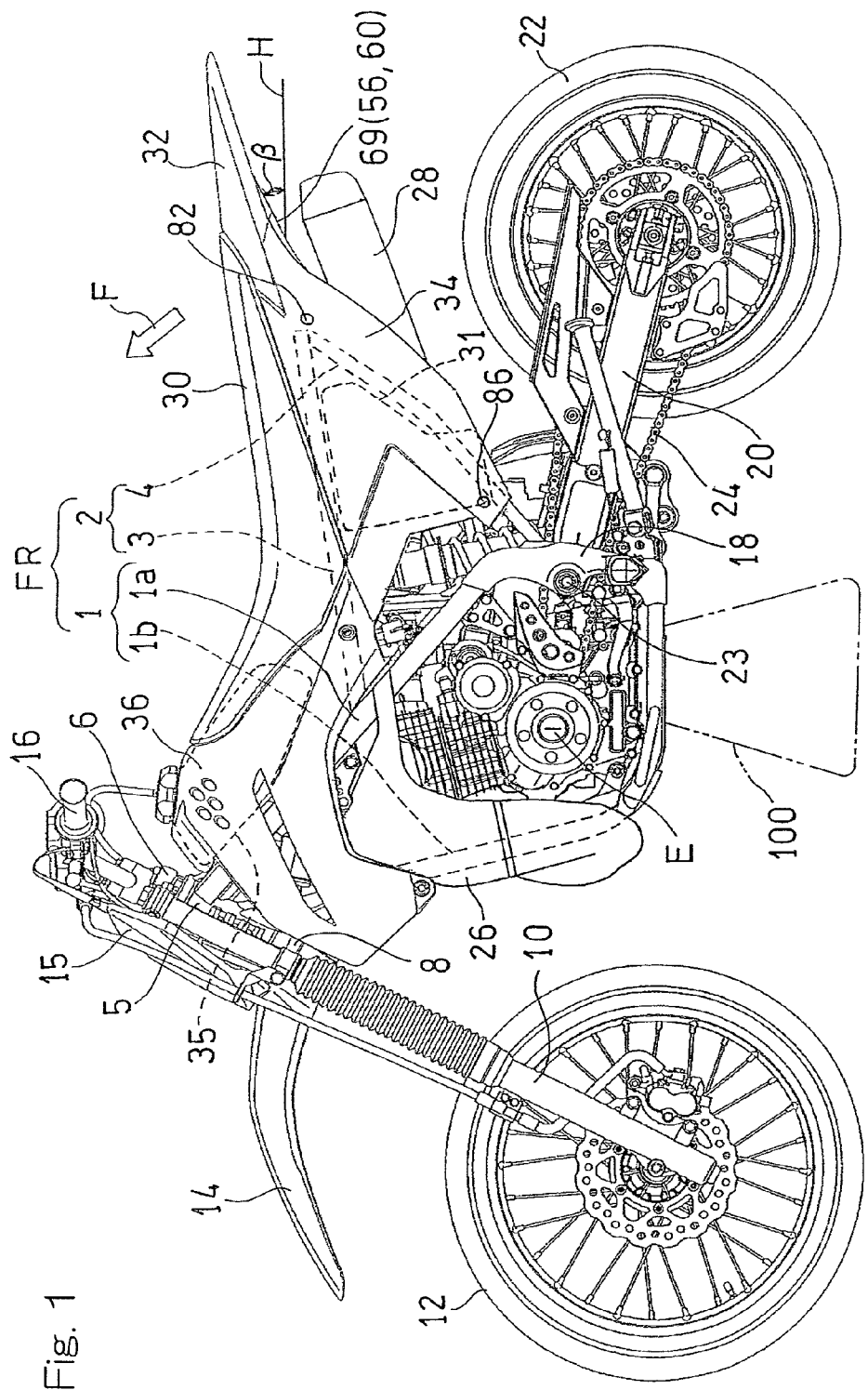
FIG. 1 is a side view of a motorcycle embodying the present invention.

A preferred embodiment of the present invention will be described in detail with reference to the accompanying drawings. It is, however, to be noted that the terms "left" and "right" used hereinabove and hereinafter are relative terms to denote opposite positions or directions, respectively, as viewed by a motorcycle rider or motorist then occupying a motorcycle rider's seat and looking forwards in a direction parallel to the longitudinal sense of the motorcycle. FIG. 1 is a side view of the motorcycle embodying the present invention. The motorcycle according to this embodiment is of a type suited not only for travel in the public thoroughfare, but also for off-road driving such as, for example, driving on irregular grounds including a mountain track, an irregular ground and a racing circuit.

The illustrated motorcycle has a motorcycle frame structure FR made up of a main frame substructure 1 to form a front frame assembly and a rear frame substructure 2 connected with the main frame substructure 1 so as to form a rear frame assembly. The main frame substructure 1 includes an upper main frame 1a, extending diagonally downwardly and rearwardly above a motorcycle combustion engine E, and a lower main frame 1b which extends forwardly of the combustion engine E in a direction downwardly thereof and then extends rearwardly below the combustion engine E so that it is rigidly connected with a rear end of the upper main frame 1a. The rear frame substructure 2 includes a pair of left and right seat rails 3, extending from an longitudinal intermediate portion of the upper main frame 1a in a direction rearwardly of the motorcycle, and a pair of left and right reinforcement members 4, which extend diagonally upwardly and rearwardly from a rear end portion of the upper main frame 1a and are then rigidly connected with respective rear ends of the seat rails 3.

A head pipe 5 is fitted to a front end portion of the main frame substructure 1, and an upper bracket 6 and an under bracket 8 are supported by the head tube 5 through a pivotally supported steering shaft (not shown). A front fork assembly 10 has its upper portion supported by the upper bracket 6 and the under bracket 8.

A front wheel 12 is rotatably supported by a lower portion of the front fork assembly 10 and a front fender 14 is fitted above the front wheel 12. A number plate 15 such as, for example, a motorcycle racer's number plate is fitted forwardly of the front fork assembly 10 and above the front fender 14. A steering handlebar 16 is fitted to the upper bracket 6 fast with the upper end portion of the front fork assembly 10.

A swingarm bracket 18 is provided at a rear end portion of the upper main frame 1a, and a swingarm 20 is supported by this swingarm bracket 18 through a pivot pin 23, which is inserted in a front end portion of the swingarm bracket 18, for movement up and down about such pivot pin 23. A rear wheel 22 is supported by a rear end portion of the swingarm 20. The combustion engine E referred to above is disposed intermediate between the upper main frame 1a and the lower main frame 1b, and this combustion engine E drives the rear wheel 22 through a drive transmission mechanism 24 such as, for example, a substantially endless chain. An exhaust pipe 26 connected with the combustion engine E is fluid connected with a muffler 28 disposed at a left upper position of the rear wheel 22.

A rider's seat 30 is supported by the rear frame substructure 2. A rear fender 32 made of a resinous material is fitted to the rear frame substructure 2 so as to occupy a position above the rear wheel 22 where it overhangs the rear wheel 22. The rear fender 32 is disposed rearwardly of the rider's seat 30 so as to overhang a region of the rear wheel 22 ranging from an area immediately above the rear wheel 22 to an upper area above a rear portion of the rear wheel 22. An air cleaner unit 31 for purifying an air to be supplied to the combustion engine E is supported by the rear frame substructure 2 so as to occupy a position below the rider's seat 30 and rearwardly of the combustion engine E. The air cleaner unit 31 is made of a resinous material and has a rear end which is, as shown in FIG. 2, held in contact with a front end of the rear fender 32.

Left and right side covers 34, each employed for one side of the motorcycle frame structure FR and made of a resinous material, are disposed below the rider's seat 30 and forwardly of the rear fender 32 so as to conceal the rear frame substructure 2, the air cleaner unit 31 and a portion of the muffler 28 from the outside.

A fuel tank 35 is fitted above the upper main frame 1a, that is, in an upper region of the motorcycle frame structure FR and between the handlebar 16 and the rider's seat 30. A shroud 36 extending from a region rearwardly of the head pipe 5 to a region below a front portion of the rider's seat 30 is fitted to the motorcycle frame structure FR, and the fuel tank 35 referred to above is covered by an upper portion of the shroud 36. This shroud 36 has a rear end continued to the side cover 34.

Figure 2:
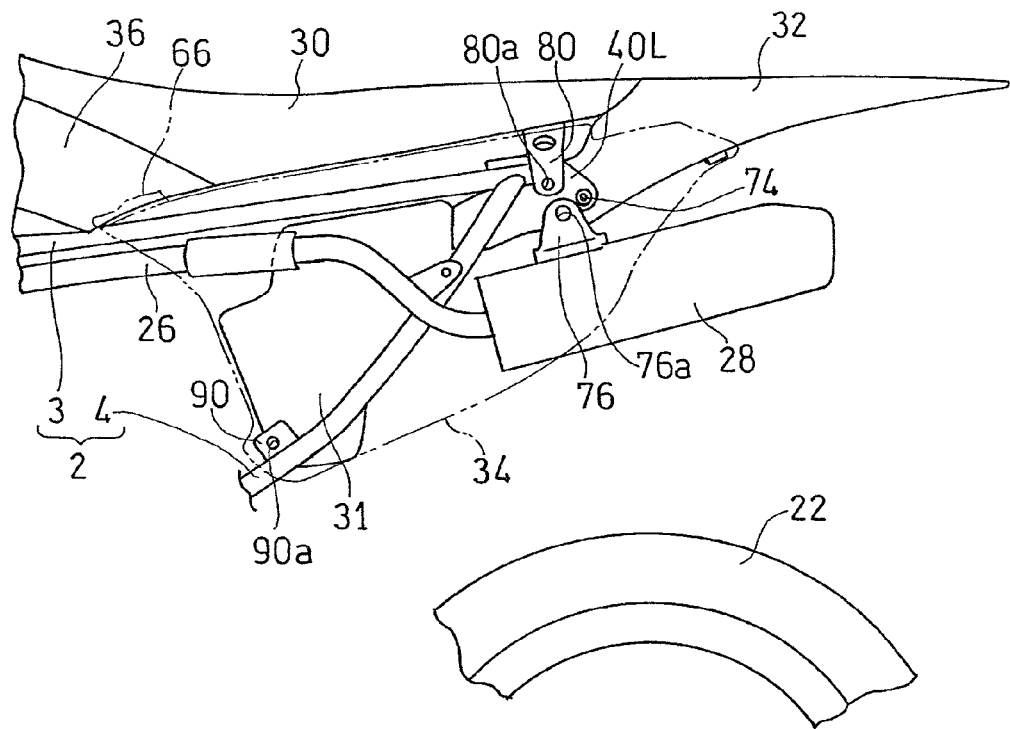
FIG. 2 is a fragmentary side view showing, on an enlarged scale, a rear frame assembly of the motorcycle with side covers removed.

FIG. 2 illustrates a fragmentary side view showing the rear portion of the motorcycle with the side cover 34 removed away. As shown therein, left and right mounting plates 40L and 40R are rigidly secured to a rear end of the rear frame substructure 2 by means of welding. A rear portion of the rider's seat 30, a front portion of the rear fender 32 and rear portions of the side covers 34 (best shown in FIG. 1) are fitted to the left and right mounting plates 40L and 40R and, also, the muffler 28 referred to previously is fitted to the left mounting plate 40L.

Figure 3:
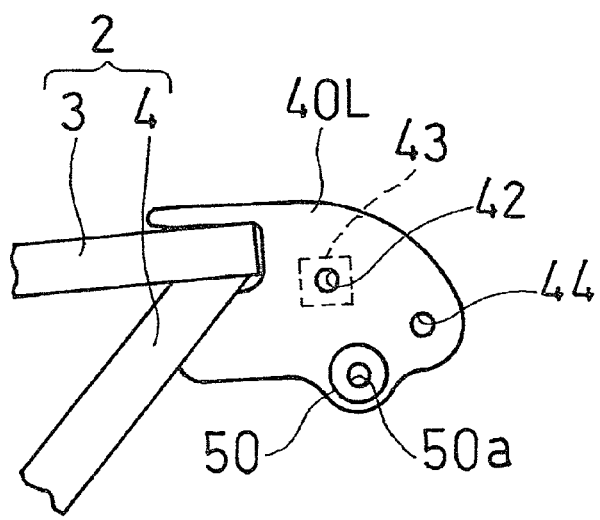
FIG. 3 is a fragmentary side view showing, on an enlarged scale, a portion of a rear frame assembly of the motorcycle.

As shown in FIG. 3, the left mounting plate 40L has a side cover mounting hole 42 and a rear fender mounting hole 44, both of which are juxtaposed relative to each other in the longitudinal direction of the motorcycle so as to open in a direction widthwise of the motorcycle. At a position of a motorcycle widthwise inner surface of the left mounting plate 40L, which corresponds to the side cover mounting hole 42, a welded nut 43 is fixed.

A muffler mounting member 50 in the form of a collared tubular member extending in a direction widthwise of the motorcycle is fitted by welding to a lower portion of the left mounting plate 40L, and a center hole of the muffler mounting member 50 forms a muffler mounting threaded hole 50a. The right mounting plate 40R is of a structure similar to the left mounting plate 40L, but differs therefrom in that no muffler mounting member 50 is employed in this right mounting plate 40R.

Figure 4:
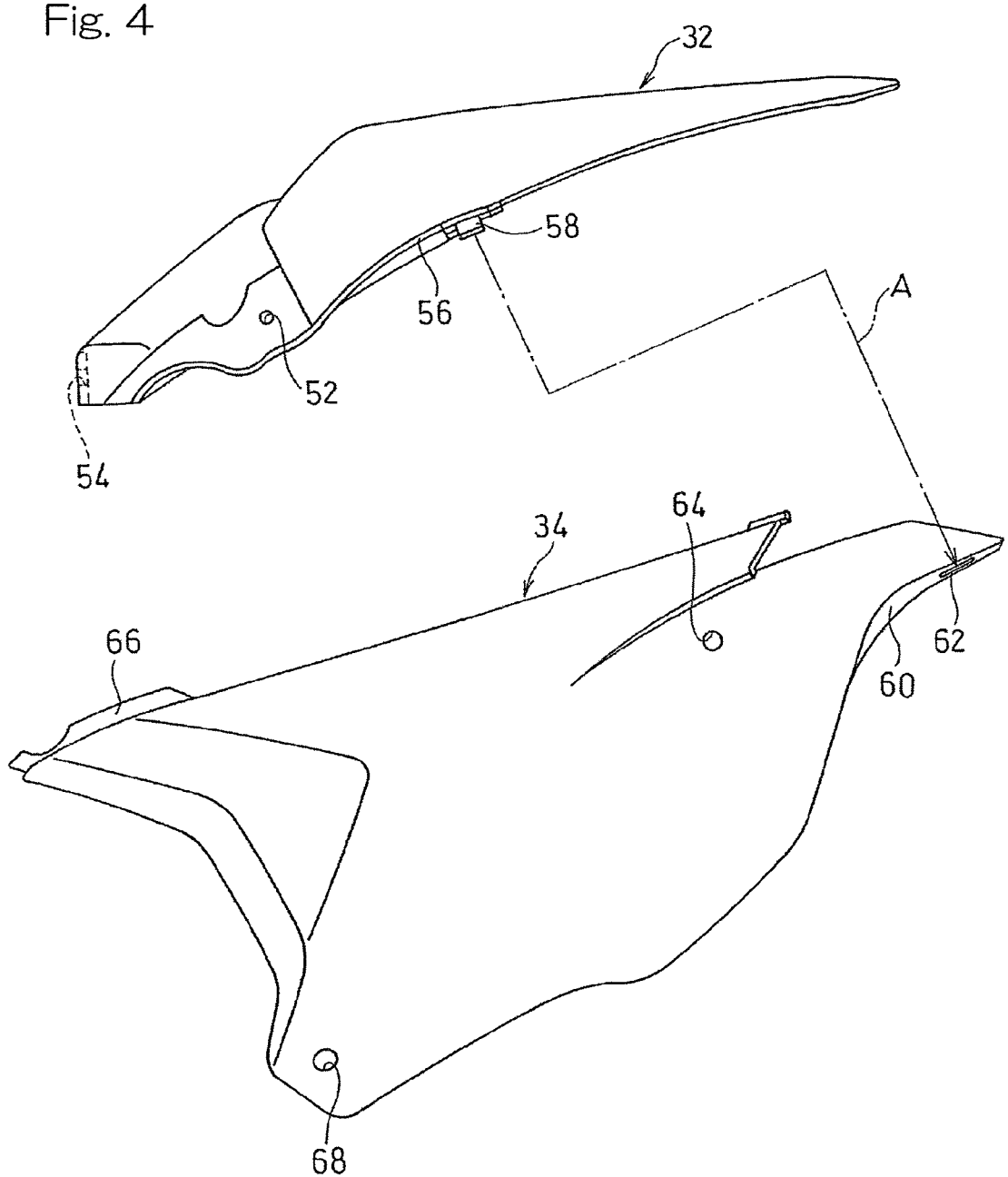
FIG. 4 is a side view showing a rear fender and one of the side covers separated from the rear fender.

Referring to FIG. 4, the rear fender 32 has left and right first insertion holes 52 defined in respective front portions thereof so as to be oriented in a direction widthwise of the motorcycle and, also, two second insertion holes 54 defined in a widthwise juxtaposition in respective front end portions thereof so as to be oriented in a direction lengthwise of the motorcycle. A fender overlap portion 56 is formed in a lower portion of an outer side of the rear fender 32.

Figure 5:
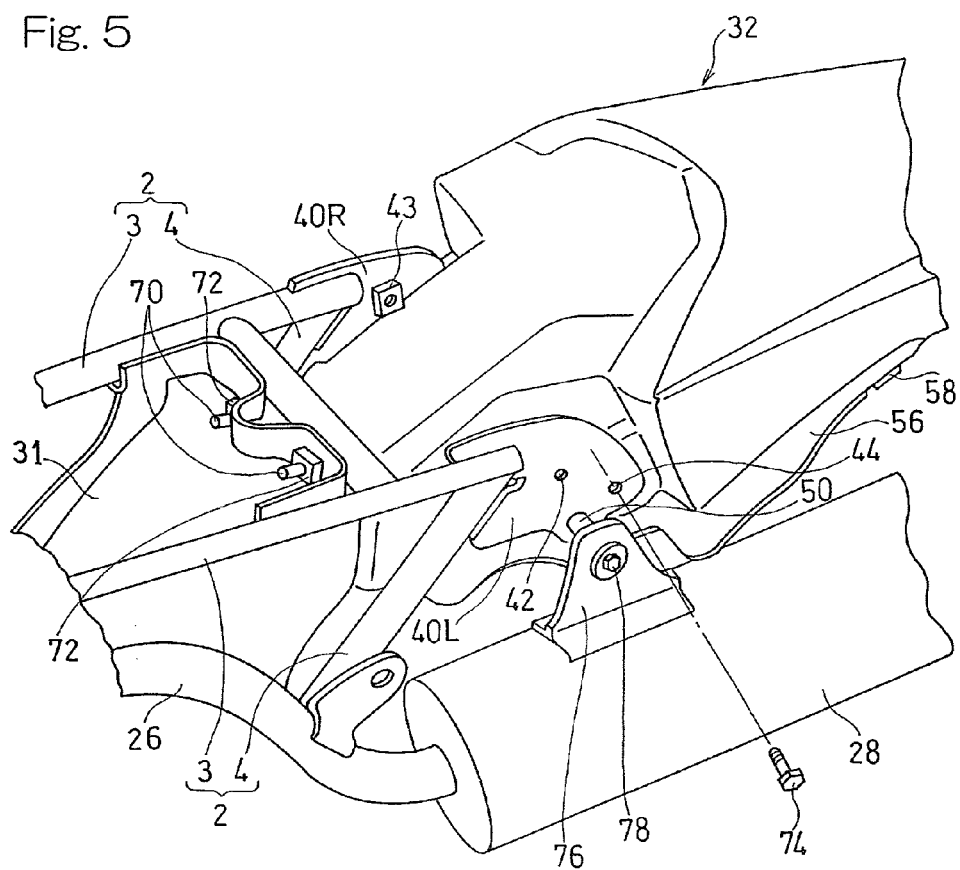
FIG. 5 is a perspective view showing a rear portion of the motorcycle with the side covers removed therefrom, as viewed from diagonally upwardly and laterally.

As shown in FIG. 5, the fender overlap portion 56 extends diagonally upwardly from a lower end of the outer side of the rear fender 32 towards the outside in the widthwise direction of the motorcycle. A projection 58 protruding downwardly is provided in a lower surface of a rear portion of the fender overlap portion 56. The first and second insertion holes 52 and 54 referred to above are provided forwardly of the projection 58.

FIG. 4 shows the left side cover 34. Since the left and right side covers 34 are identical in structure with each other, only one of those side covers, for example, the left side cover 34 will be referred to in the following description. The side cover 34 has a rear portion formed with the cover overlap portion 60 that is overlapped with the fender overlap portion 56 of the rear fender 32, and this cover overlap portion 60 is provided with a groove shaped engagement hole 62 into which the projection 58 of the rear fender 32 is inserted. The cover overlap portion 60 is parallel to the fender overlap portion 56 of the rear fender 32 and extends diagonally downwardly from a lower end of the rear portion of the side cover 34 towards the inside in the widthwise direction of the motorcycle.

Figure 7:
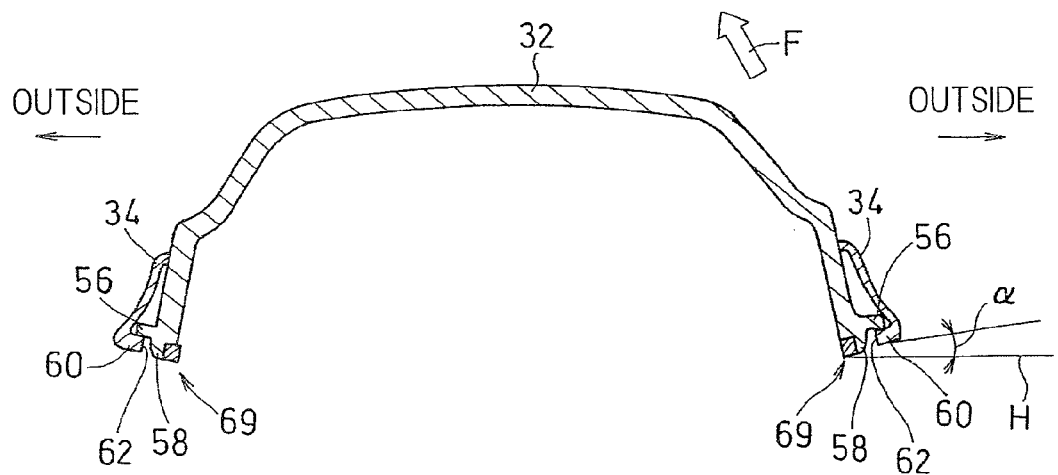
FIG. 7 is a fragmentary longitudinal sectional view showing an engagement between the rear fender and one of the side covers.

As best shown in FIG. 7, the cover overlap portion 60 of each of the side covers 34 is overlapped on a lower side of the fender overlap portion 56. The fender and cover overlap portions 56 and 60 cooperate with each other to define a gripping portion 69 at the time the rear portion of the motorcycle is uplifted. The angle of inclination $\alpha$ of the fender and cover overlap portions 56 and 60 in a transverse section is within the range of about 15 to 25°, for example, about 20° in the instance as shown, relative to a horizontal plane H in a deadhead condition. Also, the angle of inclination $\beta$ of a rear kickup of the fender overlap portion 56 and the cover overlap portion 60 shown in FIG. 1 is within the range of 15 to 30°, for example, about 23° in the instance as shown, relative to the horizontal plane H in a deadhead condition. The fender overlap portion 56 and the cover overlap portion 60 may extend straight in the transverse section but may not be absolutely straight when viewed from side and, rather, they may be curved so as to protrude somewhat upwardly to depict a convex curve.

Figure 6:
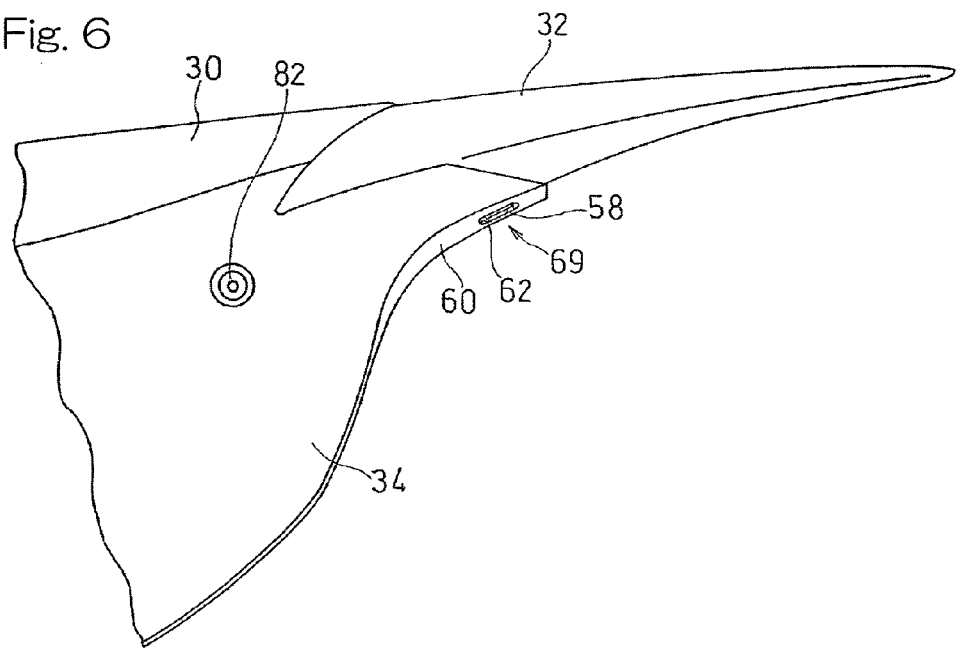
FIG. 6 is a side view showing a rear end portion of the motorcycle on an enlarged scale.

As best shown in FIG. 6, in an assembled condition, the projection 58 of the rear fender 32 is engaged in the engagement hole 62 of the side cover 34 to thereby regulate the position of the side cover 34 with respect to a leftward and rightward direction, that is, to prevent the side cover 34 from displacing in a transverse direction of the side cover 34. In other words, the projection 58 forms an engagement portion for regulating the position with respect to the leftward and rightward direction whereas the engagement hole 62 forms a to-be-engaged portion. The position of the side cover 34 with respect to an anteroposterior direction is regulated by a bolt 82 which forms a fastening member as will be described later.

At a position forwardly of the engagement hole 62 in the rear portion of the side cover 34 shown in FIG. 4, a third insertion hole 64 oriented in a direction widthwise of the motorcycle is formed. Also, at an upper end of a front portion of the side cover 34, a plug-in piece 66 is formed, and, in a lower area of the front portion of the side cover 34, a fourth insertion hole 68 oriented in a direction widthwise of the motorcycle is formed.

The manner of fitting the rear fender 32 and the side cover 34 to the motorcycle frame structure FR will now be described. At the outset, the rear fender 32 shown in FIG. 5 is fitted. By inserting a bolt 70 from rear into the second insertion hole 54 (best shown in FIG. 4) in the front end of the rear fender 32 and fastening into an insert nut 72 which has been formed in a rear end of the air cleaner unit 31, which is supported by the rear frame substructure 2, by means of an insert molding technique, the front end of the rear fender 32 is supported by the rear frame substructure 2 through the air cleaner unit 31.

Subsequently, a bolt 74, which is a fastening member, is inserted from the outside in the motorcycle widthwise direction sequentially into the rear fender mounting holes 44 in the mounting plates 40L and 40R and then into the first insertion hole 52 (best shown in FIG. 4) of the front portion of the rear fender 32, and is threaded into a nut (not shown) at a location inwardly of the rear fender 32 to thereby allow the front portion of the rear fender 32 to be supported by the rear frame substructure 2.

Before the side cover 34 is fitted, the muffler 28 is fitted to the left mounting plate 40L. Specifically, a bolt 78 is inserted from an outer lateral side into a bolt insertion hole 76a (best shown in FIG. 2) in a muffler bracket 76, which has been fixed to an upper portion of the muffler 28, and is subsequently threaded into the muffler mounting threaded hole 50a (best shown in FIG. 3) in the muffler mounting member 50 of the mounting plate 40L to allow the muffler 28 to be supported by the rear frame substructure 2 through the mounting plate 40L.

Thereafter, the side cover 34 is fitted. At the outset, an upper surface of the cover overlap portion 60 of the side cover 34 is overlapped on an undersurface of the fender overlap portion 56 of the rear fender 32 shown in FIG. 7, followed by an engagement of the projection 58 of the rear fender 32 into the engagement hole 62 in the side cover 34.

Figure 8:
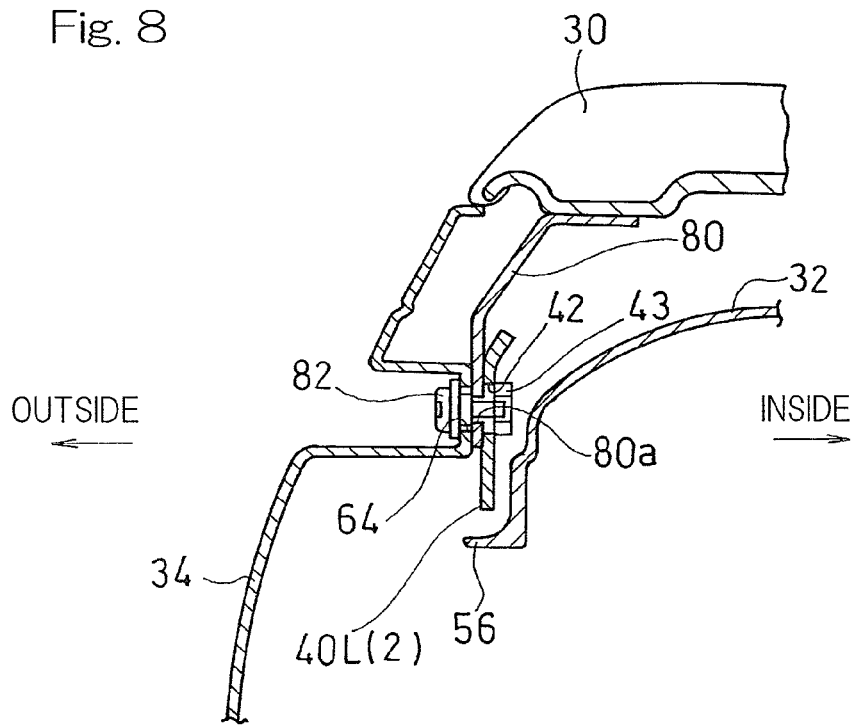
FIG. 8 is a fragmentary longitudinal sectional view showing a connection between one of the side cover and the rear frame assembly of the motorcycle.

Also, the side cover 34 is fitted to the rear frame substructure 2 by means of bolts 82 and 86 shown in FIG. 1. The rear portion of the side cover 34 is, as shown in FIG. 8, fitted to the mounting plate 40L together with the rider's seat 30. Specifically, the bolt 82 is inserted from the outside in the motorcycle widthwise direction through the third insertion hole 64 in the side cover 34 and then through the bolt insertion hole 80a in a seat bracket 80, provided in the rider's seat 30, and is threaded into the welded nut 43 in the side cover mounting hole 42 of the mounting plate 40L of the rear frame substructure 2, thus allowing the rear portion of the side cover 34 and the rear portion of the rider's seat 30 to be supported by the rear frame substructure 2. A front portion and a longitudinal intermediate portion of the rider's seat 30 are supported by the rear frame substructure 2 by means of separate means.

The upper portion of the front portion of the side cover 34 shown in FIG. 1 is fitted to the shroud 36 when the inserting piece 66 (best shown in FIG. 4) is inserted into a to-be-inserted portion (not shown) of a rear portion of the shroud 36. A lower portion of the front portion of the side cover 34 is fitted to a lower portion covering mounting bracket 90 (best shown in FIG. 2) of the rear frame substructure 2 by means of a bolt 86. More specifically, the bolt 86 is inserted into the fourth insertion hole 68 (best shown in FIG. 4) of the side cover 34 from the outside and is fastened to a threaded hole 90a (shown in FIG. 2) defined in the lower portion covering mounting bracket 90.

In the construction described above, as shown in FIG. 6, since the front portion of the rear fender 32 and the rear portion of the side cover 34 are engaged with each other, opening of the rear portion of the side cover 34 in leftward and rightward directions is suppressed with no gap formed between the rear fender 32 and the side cover 34. Also, since the rear portion of the side cover 34 is merely engaged in the front portion of the rear fender 32, the rear fender 32 need not be extended forwardly, be overlapped with the side cover 34 and be bolted to the side cover 34, and, hence, an increase in size of the rear fender 32 can also be avoided.

In the case of the motorcycle shown in FIG. 1, which is specifically designed for driving in a racing circuit, in a condition with the handlebar 16 on one side of the motorcycle gripped by a hand and with the other hand gripping the gripping portion 69 on the other side, the rear portion of the motorcycle is uplifted to allow the lower main frame 1b to be mounted on a maintenance stand 100 provided separately. In the illustrated embodiment, since the gripping portion 69 extends in the motorcycle widthwise direction, it is easy for the hand to be used in uplifting the rear portion of the motorcycle, and also since the rear fender 32 and the side cover 34 are overlapped, the gripping portion 69 has a high strength. In this instance, the gripping portion 69 is diagonally upwardly inclined at the angle of inclination α towards the outside and is also, as shown in FIG. 1, inclined diagonally upwardly at the angle of inclination β towards the rear. Therefore, the force of the hand is efficiently applied to the gripping portion 69 in a right angled direction, that is, in a direction diagonally upwardly and forwardly and towards the motorcycle inner side (shown in FIG. 7), and as a result, the uplifting of the motorcycle rear portion become easy to achieve.

As shown in FIG. 7, the projection 58 protruding downwardly is provided in the undersurface of the fender overlapping portion 56 and the engagement hole 62, which is oriented in a vertical direction, is provided in the cover overlap portion 60 comprised of a flat surface. Therefore, the engagement and the to-be-engaged portion can be realized with a simplified structure. Also, the engagement portion comprised of the projection 58 improves the rigidity of the fender overlap portion 56.

As shown in FIG. 6, since the side cover 34 is connected with the rear frame substructure 2 (shown in FIG. 1) by means of the bolt 82 at a site forwardly of the cover overlap portion 60, a bolt fastening portion and an engagement portion cooperate with each other to stably support the rear portion of the side cover 34.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing the preferred embodiment, reference has been made to the racing motorcycle that is driven in the racing circuit, the present invention can be applied to any motorcycle in general.

Also, although in the previously described embodiment, the projection (engagement portion) 58 has been shown and described as formed in the fender overlap portion 56 and the engagement hole (to-be-engaged portion) 62 has been shown and described as formed in the cover overlap portion 60, the engagement hole and the projection may be formed in the fender overlap portion 56 and the cover overlap portion 60, respectively.

Accordingly, such changes and modifications are, unless they depart from the scope of the present invention as delivered from the claims annexed hereto, to be construed as included therein.

REFERENCE NUMERALS

2: Rear frame substructure (Motorcycle frame structure)
22: Rear wheel
30: Rider's seat
32: Rear fender
34: Side cover
56: Fender overlap portion
58: Projection (Engagement portion)
60: Cover overlap portion
62: Engagement hole (To-be-engaged portion)
69: Gripping portion

What is claimed is:

1. A motorcycle which comprises:
a rear fender overhanging a rear wheel, the rear fender being disposed rearwardly of a rider's seat; and
a side cover concealing a motorcycle frame structure from outside at a location below the rider's seat, the side cover being disposed below the rider's seat and forwardly of the rear fender,
wherein
the rear fender has an outer side portion and a fender overlap portion being formed in a lower portion of the outer side portion of the rear fender,
the side cover has a rear portion and a cover overlap portion being formed in a rear portion of the side cover for engagement with the fender overlap portion, and
one of the fender and cover overlap portions has an engagement portion and the other of the fender and cover overlap portions has a to-be-engaged portion, the engagement portion being engaged with the to-be-engaged portion to thereby regulate the position of the side cover in leftward and rightward directions, and
the engagement portion includes a projection, and the to-be-engaged portion includes an engagement hole into which the projection is inserted.

2. A motorcycle which comprises:
a rear fender overhanging a rear wheel, the rear fender being disposed rearwardly of a rider's seat; and
a side cover concealing a motorcycle frame structure from outside at a location below the rider's seat, the side cover being disposed below the rider's seat and forwardly of the rear fender, wherein,
the rear fender has an outer side portion and a fender overlap portion being formed in a lower portion of the outer side portion of the rear fender,
the side cover has a rear portion and a cover overlap portion being formed in a rear portion of the side cover for engagement with the fender overlap portion,
one of the fender and cover overlap portions has an engagement portion and the other of the fender and cover overlap portions has a to-be-engaged portion, the engagement portion being engaged with the to-be-engaged portion to thereby regulate the position of the side cover leftward and rightward directions, and the fender and cover overlap portions cooperate with each other to form a gripping portion extending in a direction widthwise of the motorcycle, the gripping portion being gripped when a motorcycle rear substructure is to be uplifted.

3. The motorcycle as claimed in claim 2, in which the fender overlap portion has an undersurface formed with a projection that serves as the engagement portion, and the cover overlap portion is provided with an engagement hole in which the projection is inserted.

4. The motorcycle as claimed in claim 1, in which the fender and cover overlap portions extend diagonally upwardly towards the outside in a direction widthwise of the motorcycle.

5. The motorcycle as claimed in claim 1, in which the side cover is connected with the motorcycle frame structure by means of a fastening member at a location forwardly thereof remote from the cover overlap portion.

6. The motorcycle as claimed in claim 2, in which the fender and cover overlap portions extend diagonally upwardly toward the outside in a direction widthwise of the motorcycle.

7. The motorcycle as claimed in claim 2, in which the side cover is connected with the motorcycle frame structure by means of a fastening member at a location forwardly thereof remote from the cover overlap portion.

* * * * *